US009892716B2

(12) United States Patent
Sugimoto

(10) Patent No.: US 9,892,716 B2
(45) Date of Patent: Feb. 13, 2018

(54) IMAGE DISPLAY PROGRAM, IMAGE DISPLAY METHOD, AND IMAGE DISPLAY SYSTEM

(71) Applicant: SQUARE ENIX CO., LTD., Tokyo (JP)

(72) Inventor: Koji Sugimoto, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 111 days.

(21) Appl. No.: 14/839,067

(22) Filed: Aug. 28, 2015

(65) Prior Publication Data
US 2016/0086585 A1 Mar. 24, 2016

(30) Foreign Application Priority Data

Sep. 24, 2014 (JP) .................................. 2014-193819

(51) Int. Cl.
*G09G 5/391* (2006.01)
*G06F 3/14* (2006.01)

(52) U.S. Cl.
CPC .............. *G09G 5/391* (2013.01); *G06F 3/14* (2013.01); *G09G 2340/0407* (2013.01); *G09G 2340/0442* (2013.01); *G09G 2370/04* (2013.01)

(58) Field of Classification Search
CPC . G06F 3/1415; G06F 3/1423; G09G 2320/08; G09G 2340/0442; G09G 5/005; H04N 21/4316; H04N 21/440263; H04N 21/4622; H04N 5/44591; H04N 5/46; H04N 7/0122
See application file for complete search history.

(56) References Cited

U.S. PATENT DOCUMENTS

| 2006/0139379 A1* | 6/2006 | Toma ........................ G06T 3/40 345/698 |
| 2008/0088740 A1* | 4/2008 | Kondo ............... H04N 5/44591 348/556 |
| 2008/0192141 A1 | 8/2008 | Aoki |
| 2012/0019534 A1 | 1/2012 | Aoki |
| 2013/0141456 A1* | 6/2013 | Sokolov .................... G06F 3/14 345/620 |
| 2014/0184473 A1 | 7/2014 | Aoki |

FOREIGN PATENT DOCUMENTS

| JP | 2002-221955 | 8/2002 |
| JP | 2006-106371 | 4/2006 |

* cited by examiner

*Primary Examiner* — Sultana M Zalalee
(74) *Attorney, Agent, or Firm* — Greenblum & Bernstein, P.L.C.

(57) ABSTRACT

An image display program executed in an image display apparatus includes a display section that displays an image, and the program causes the image display apparatus to function as: an image size determiner that determines whether an image size satisfies a predetermined condition; an image size adjuster that adjusts the image size, when it is determined by the image size determiner that the image size does not satisfy the predetermined condition, in a state where the ratio of vertical length and horizontal length of the image is maintained; and an image displayer that displays the adjusted image by the image size adjuster in the display section, when the image size does not satisfy the predetermined condition, and displays an image stored by an image size storage in the display section, when the image size satisfies the predetermined condition.

15 Claims, 16 Drawing Sheets

IMAGE DISPLAY APPARATUS 1

IMAGE DISPLAY PROGRAM, IMAGE DISPLAY METHOD, AND IMAGE DISPLAY SYSTEM

CROSS REFERENCE TO RELATED APPLICATION

The present disclosure relates to subject matter contained in Japanese Patent Application No. 2014-193819, filed on Sep. 24, 2014, the disclosure of which is expressly incorporated herein by reference in its entirety.

TECHNICAL FIELD

The present invention relates to an image display program, an image display method, and an image display system.

BACKGROUND ART

An image output apparatus such as a game console or a DVD player that generates and outputs a video or an image is used in a state of being connected to an image display apparatus such as a liquid crystal television, a personal computer display or a game console display. The ratio of vertical length and horizontal length of a screen in a front view of such an image display apparatus (hereinafter, referred to as an aspect ratio) is not consistent. Particularly, it is known that aspect ratios of screens of mobile terminal devices such as smart phones or tablet terminals are different according to model type.

When the ratio of the vertical length and the horizontal length of an image which is an output target is different from an aspect ratio of an image display apparatus, an output method based on a letterboxing scheme, a squeezing scheme or the like, or a method of adjusting and displaying the image to correspond to the aspect ratio of the image display apparatus using a program is widely used. For example, a method of determining the type of an apparatus that outputs an image and changing the image to be output according to the type of a display (for example, see JP2002-221955A), or a method of prescribing a division pattern for dividing a display screen of an image display apparatus into plural areas in association with an aspect ratio of the display screen to output an image without collapsing the content of the image with respect to an image display apparatus having a different aspect ratio (for example, see JP2006-106371A) is used.

SUMMARY OF INVENTION

Technical Problem

However, in the method disclosed in JP2002-221955A, it is necessary to prepare an image according to the type of the display. Further, in the method disclosed in JP2006-106371A, it is necessary to define the division pattern according to the display screen. Both the image display methods are based on the assumption that the aspect ratio of the screen of the image display apparatus can be estimated, and thus, cannot appropriately display an image with respect to a screen of an aspect ratio which is not estimated.

On the other hand, a strict standard relating to the size of a display of a mobile terminal such as a smart phone is not present, and in many cases, aspect ratios of display screens are different according to types of models. When an image is displayed with respect to screens having different aspect ratios, in order to display the image without collapsing content of the image, a countermeasure of displaying a frame outside the image by a letterboxing scheme to generate an image in which the ratio of the vertical length and the horizontal length of the image and an aspect ratio of a screen match each other has been proposed. However, when the size of the image is adjusted, the frame is displayed, or the display size is reduced, which may damage visibility of the image. Thus, it is preferable to provide an image display technique capable of displaying an image on screens having plural different aspect ratios and widely displaying the image without reducing image visual quality.

An object of at least one embodiment of the invention is to provide an image display program, an image display method and an image display system capable of displaying an image without reducing image visual quality with respect to image display apparatuses having different aspect ratios.

Solution to Problem

According to a non-limiting aspect, a computer-readable recording medium of the present invention is the non-transitory computer-readable recording medium having recorded thereon an image display program which is executed in an image display apparatus that includes a display section that displays an image, the program causing the image display apparatus to function as: an image reader that reads an image; an image size determiner that determines whether an image size of the image read by the image reader satisfies a predetermined condition; an image size adjuster that adjusts the image size, when it is determined by the image size determiner that the image size does not satisfy the predetermined condition, so as to satisfy the predetermined condition in a state where similar figures to the image are retained; and an image displayer that displays an adjusted image, when it is determined by the image size determiner that the image size does not satisfy the predetermined condition, of which the image size is adjusted by the image size adjuster in the display section, and displays the image read by the image reader in the display section, when it is determined that the image size satisfies the predetermined condition, wherein the predetermined condition is a condition that the image size is within a predetermined range with respect to a screen size of the display section.

According to a non-limiting aspect, an image display method of the present invention is the image display method executed in an image display apparatus that includes a display section that displays an image, the method comprising the following functional steps executed in the image display apparatus: reading an image; determining whether or not an image size of the read image satisfies a predetermined condition; adjusting the image size, when it is determined in the determining step that the image size does not satisfy the predetermined condition, so as to satisfy the predetermined condition in a state where similar figures to the image are retained; and displaying an adjusted image, when it is determined in the determining step that the image size does not satisfy the predetermined condition, of which the image size is adjusted in the adjusting step in the display section, and displaying, when it is determined that the image size satisfies the predetermined condition, the read image in the display section, wherein the predetermined condition is a condition that the image size is within a predetermined range with respect to a screen size of the display section.

According to a non-limiting aspect, a computer-readable recording medium of the present invention is the non-transitory computer-readable recording medium having recorded thereon an image display program which is executed in an image providing server apparatus capable of communicating with an image display apparatus that includes a display section that displays an image, the program causing the image providing server apparatus to function as: an image size storage that stores an image size of an image to be provided; an image size determiner that determines whether the image size of the stored image satisfies a predetermined condition; an image size adjuster that adjusts the image size, when it is determined by the image size determiner that the image size does not satisfy the predetermined condition, so as to satisfy the predetermined condition in a state where similar figures to the image are retained; and an image transmitter that transmits an adjusted image, when it is determined by the image size determiner that the image size does not satisfy the predetermined condition, of which the image size is adjusted by the image size adjuster to the image display apparatus, and transmits the image stored in the image size storage to the image display apparatus, when it is determined that the image size satisfies the predetermined condition, wherein the predetermined condition is a condition that the image size is within a predetermined range with respect to a screen size of the display section.

According to a non-limiting aspect, an image display system of the present invention is the image display system including an image display apparatus that includes a display section that displays an image, and an image providing server apparatus capable of communicating with the image display apparatus, the image display apparatus including: an image transmission request transmitter that transmits an image transmission request to the image providing server apparatus, the image providing server apparatus including: an image size storage that stores an image size of an image to be provided; an image transmission request receiver that receives the image transmission request transmitted by the image transmission request transmitter; an image size determiner that determines whether the image size of the stored image satisfies a predetermined condition; an image size adjuster that adjusts the image size, when it is determined by the image size determiner that the image size does not satisfy the predetermined condition, so as to satisfy the predetermined condition in a state where similar figures to the image are retained; and an image transmitter that transmits an adjusted image, when it is determined by the image size determiner that the image size does not satisfy the predetermined condition, of which the image size is adjusted by the image size adjuster to the image display apparatus, and transmits the image stored in the image size storage to the image display apparatus, when it is determined that the image size satisfies the predetermined condition; and the image display apparatus further including: an image receiver that receives the image transmitted by the image transmitter; and an image displayer that displays the received image in the display section, wherein the predetermined condition is a condition that the image size is within a predetermined range with respect to a screen size of the display section.

According to a non-limiting aspect, a computer-readable recording medium of the present invention is the non-transitory computer-readable recording medium having recorded thereon an image display program which is executed in an image display apparatus that is capable of communicating with an image providing server apparatus that provides an image, and includes a display section that displays the image, the program causing the image display apparatus to function as: an image transmission request transmitter that transmits an image transmission request to the image providing server apparatus; an image receiver that receives an image transmitted by an image transmitter; and an image displayer that displays the received image in the display section, wherein the image providing server apparatus functions as: an image size storage that stores an image size of an image to be provided; an image transmission request receiver that receives the image transmission request transmitted by the image transmission request transmitter; an image size determiner that determines whether the image size of the stored image satisfies a predetermined condition; an image size adjuster that adjusts the image size, when it is determined by the image size determiner that the image size does not satisfy the predetermined condition, so as to satisfy the predetermined condition in a state where similar figures to the image are retained; and an image transmitter that transmits an adjusted image, when it is determined by the image size determiner that the image size does not satisfy the predetermined condition, of which the image size is adjusted by the image size adjuster to the image display apparatus, and transmits the image stored in the image size storage to the image display apparatus, when it is determined that the image size satisfies the predetermined condition, and wherein the predetermined condition is a condition that the image size is within a predetermined range with respect to a screen size of the display section.

According to a non-limiting aspect, an image display method of the present invention is the image display method executed in an image providing server apparatus capable of communicating with an image display apparatus that includes a display section that displays an image, the method comprising the following functional steps executed in the image providing server apparatus: determining whether or not an image size of an image satisfies a predetermined condition; adjusting the image size, when it is determined in the determining step that the image size does not satisfy the predetermined condition, so as to satisfy the predetermined condition in a state where similar figures to the image are retained; and transmitting an adjusted image, when it is determined in the determining step that the image size does not satisfy the predetermined condition, of which the image size is adjusted in the adjusting step to the image display apparatus, and transmitting an image before adjustment to the image display apparatus, when it is determined that the image size satisfies the predetermined condition, wherein the predetermined condition is a condition that the image size is within a predetermined range with respect to a screen size of the display section.

According to a non-limiting aspect, an image display method of the invention is the image display method executed in an image display system including an image display apparatus that includes a display section that displays an image, and an image providing server apparatus capable of communicating with the image display apparatus, the method comprising: transmitting an image transmission request to the image providing server apparatus, by the image display apparatus; receiving the transmitted image transmission request, by the image providing server apparatus;

determining whether the image size of the image satisfies a predetermined condition, by the image providing server apparatus; adjusting the image size, when it is determined in the determining that the image size does not satisfy the predetermined condition, so as to satisfy the predetermined condition in a state where similar figures to the image are retained, by the image providing server apparatus; transmitting an adjusted image, when it is determined in the determining that the image size does not satisfy the predetermined condition, of which the image size is adjusted in the adjusting to the image display apparatus, and transmitting an image before adjustment to the image display apparatus by the image providing server apparatus, when it is determined that the image size satisfies the predetermined condition; receiving the image transmitted from the image providing server apparatus, by the image display apparatus; and displaying the received image in the display section, by the image display apparatus, and the predetermined condition is a condition that the image size is within a predetermined range with respect to a screen size of the display section.

Advantageous Effects of Invention

One or more of the above problems can be solved with each embodiment of the present invention.

DESCRIPTION OF EMBODIMENTS

Hereinafter, embodiments of the invention will be described with reference to the accompanying drawings. Hereinafter, description relating to effects is an aspect of the effects of the exemplary embodiments of the invention, and is not limited to the described effects. Further, the order of respective processes that form flowcharts described below may be random in a range where contradiction or inconsistency does not occur in the content of the processes.

First Embodiment

Figure 1:
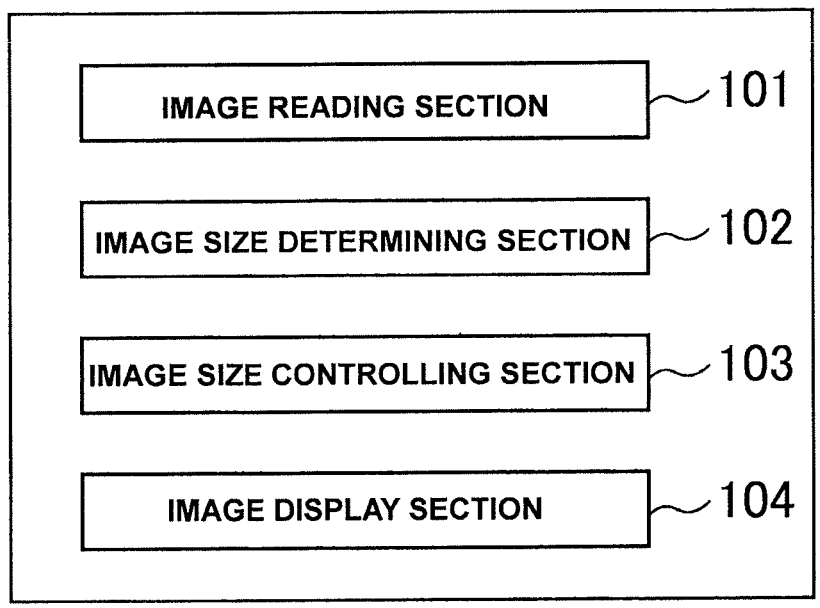
FIG. 1 is a block diagram illustrating a configuration of an image display apparatus according to at least one embodiment of the invention.

A first embodiment of the invention will be described. FIG. 1 is a block diagram illustrating a configuration of an image display apparatus according to at least one embodiment of the invention. An image display apparatus 1 at least includes an image reading section 101, an image size determining section 102, an image size controlling section 103, and an image display section 104.

The image reading section 101 has a function of reading an image into the image display apparatus 1. The image size determining section 102 has a function of determining whether an image size of the image read by the image reading section 101 satisfies a predetermined condition. The image size controlling section 103 has a function of controlling the image size, when it is determined by the image size determining section 102 that the image size does not satisfy the predetermined condition, so as to satisfy the predetermined condition in a state where similar figures to the image are retained. The image display section 104 has a function of displaying an adjusted image, when it is determined by the image size determining section 102 that the image size does not satisfy the predetermined condition, of which the image size is controlled by the image size controlling section 103 in a display section, and displaying the image read by the image reading section 101 in the display section, when it is determined that the image size satisfies the predetermined condition.

Figure 2:
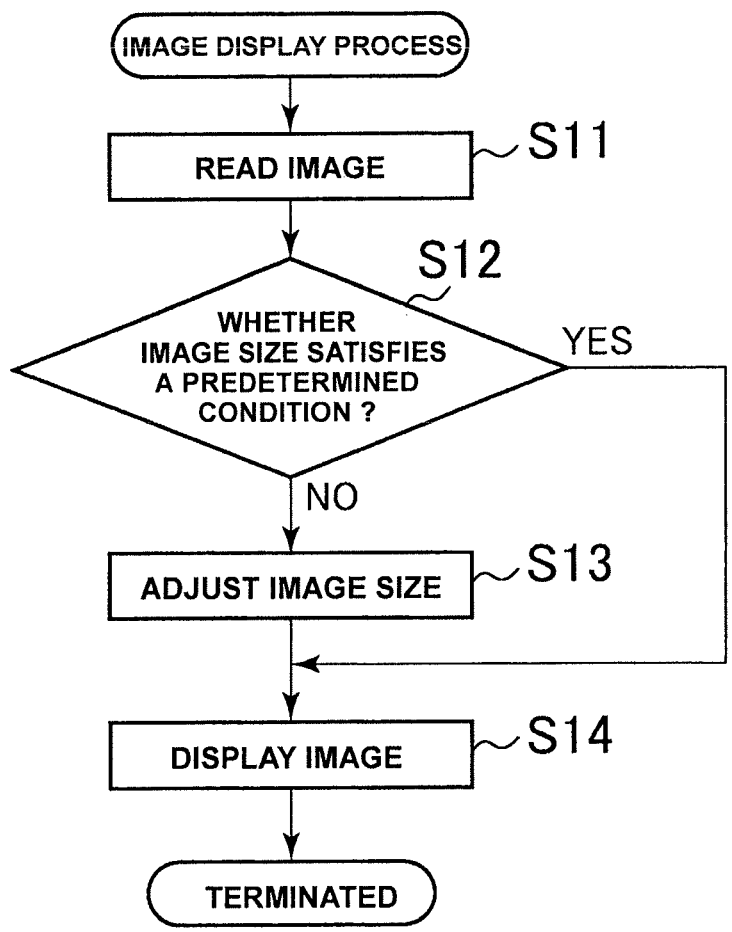
FIG. 2 is a flowchart illustrating an image display process according to at least one embodiment of the invention.

An image display process according to the first embodiment of the invention will be described. FIG. 2 is a flowchart illustrating an image display process according to at least one embodiment of the invention. First, in an image display apparatus 1, an image is read (step S11). Then, it is determined whether the image size of the image read in step S11 satisfies a predetermined condition (step S12). When it is determined that the image size does not satisfy the predetermined condition (NO in step S12), the image size is controlled so as to satisfy the predetermined condition in a state where similar figures to the image are retained (step S13). When it is determined that the image size does not satisfy the predetermined condition (NO in step S12), the controlled image of which the image size is controlled in step S13 is displayed in the display section, and when it is determined that the image size satisfies the predetermined condition (YES in step S12), the read image in step S11 is displayed in the display section (step S14), and then, the process is terminated. The predetermined condition in determining the image size in step S12 is a condition that the image size is within a predetermined range with respect to a screen size of the display section.

As an aspect of the first embodiment, when the image size satisfies the predetermined condition, the image size is not controlled, and thus, it is possible to prevent reduction in image visual quality due to adjustment. Further, as the image size is controlled to satisfy the predetermined condition in a state where the similar figures to the image are retained, it is possible to display the image without reducing image visual quality with respect to the image display apparatus having a different aspect ratio.

In the first embodiment, the "image" indicates a figure, a photo, a picture, a graphic, or the like, or may be either of a still image or a moving image. The "display section" indicates a monitor, a display, or the like for displaying an image, which may use liquid crystals, plasma, or the like, and may be mounted with a panel with touch sensor, for example. The "image reading" indicates that image data is read from a storage device provided in the image display apparatus, for example, or is read from a storage medium such as a DVD through a reading device. The "image size" indicates the size of the image in a horizontal direction and a vertical direction, in a front view of the image, using the unit of pixels, dots or critical areas. The "predetermined condition" indicates a condition for determining whether to control the size of the image, for example. The "similar figures" indicate figures having the same ratio of corresponding sides and having the same corresponding angles. The "predetermined range with respect to the screen size" indicates a range of a predetermined ratio with respect to the screen size, or a range of a predetermined distance from an edge of the image.

Second Embodiment

Figure 3:
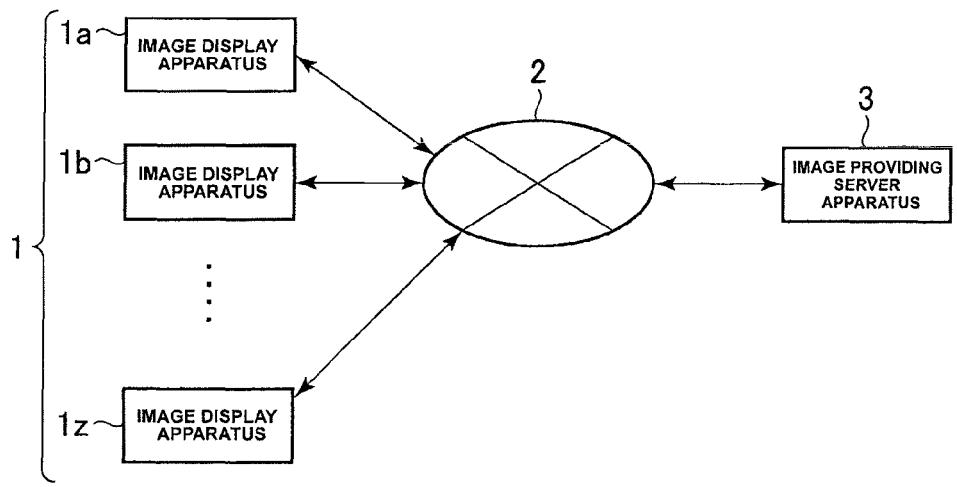
FIG. 3 is a block diagram illustrating a configuration of an image display system according to at least one embodiment of the invention.

The outline of a second embodiment will be described. FIG. 3 is a block diagram illustrating a configuration of an image display system according to at least one embodiment of the invention. As shown in FIG. 3, the image display system includes plural image display apparatuses 1 (image display apparatuses 1a, 1b, . . . , and 1z) watched by plural users (users A, B, . . . , and Z), an image providing server apparatus 3, and a communication line 2. The image display apparatus 1 is connected to the image providing server apparatus 3 through the communication line 2. The image display apparatus 1 may not be constantly connected to the image providing server apparatus 3, and may be connected thereto as necessary. Further, the image display apparatus 1 includes a display section that displays an image.

Figure 4:
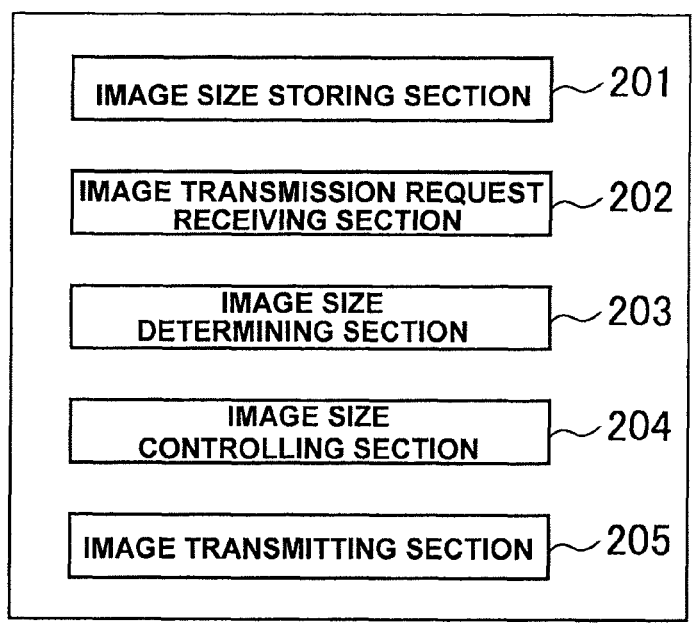
FIG. 4 is a block diagram illustrating a configuration of an image providing server apparatus according to at least one embodiment of the invention.

FIG. 4 is a block diagram illustrating a configuration of an image providing server apparatus according to at least one embodiment of the invention. The image providing server apparatus 3 at least includes an image size storing section 201, an image transmission request receiving section 202, an image size determining section 203, an image size controlling section 204, and an image transmitting section 205.

The image size storing section 201 has a function of storing the image size of an image to be provided. The image transmission request receiving section 202 has a function of receiving an image transmission request transmitted from the image display apparatus. The image size determining section 203 has a function of determining whether the image size satisfies a predetermined condition. The image size controlling section 204 has a function of controlling the image size, when it is determined by the image size determining section 203 that the image size does not satisfy the predetermined condition, so as to satisfy the predetermined condition in a state where similar figures to the image are retained. The image transmitting section 205 has a function of transmitting, an adjusted image when it is determined by the image size determining section 203 that the image size does not satisfy the predetermined condition, of which the image size is controlled by the image size controlling section 204, and transmitting the image stored in the image size storing section 201 to the image display apparatus, when it is determined that the image size satisfies the predetermined condition.

Figure 5:
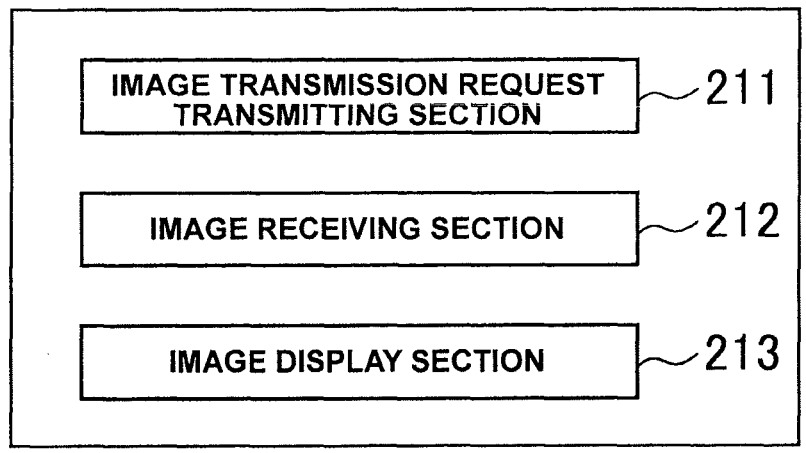
FIG. 5 is a block diagram illustrating a configuration of an image display apparatus according to at least one embodiment of the invention.

FIG. 5 is a block diagram illustrating a configuration of an image display apparatus according to at least one embodiment of the invention. The image display apparatus 1 at least includes an image transmission request transmitting section 211, an image receiving section 212, and an image display section 213.

The image transmission request transmitting section 211 has a function of transmitting an image transmission request to the image providing server apparatus. The image receiving section 212 has a function of receiving an image transmitted by the image transmitting section 205. The image display section 213 has a function of displaying the image received by the image receiving section 212 in the display section.

Figure 6:
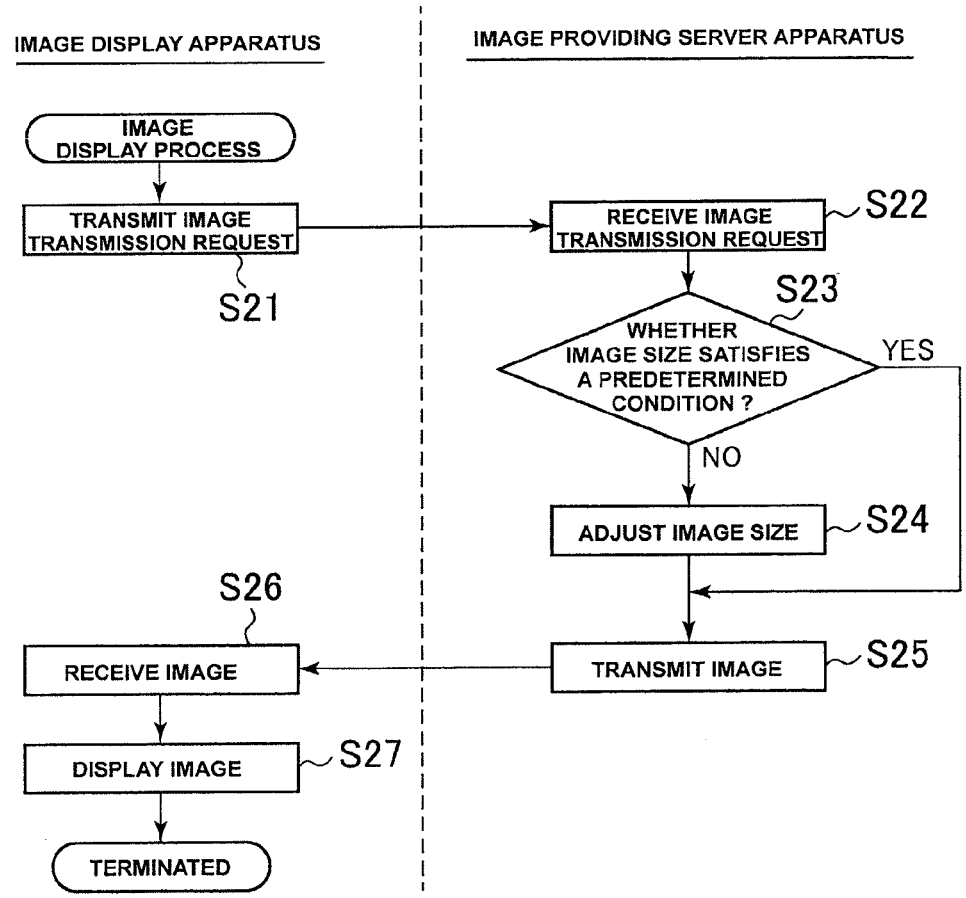
FIG. 6 is a flowchart illustrating an image display process according to at least one embodiment of the invention.

An image display process in the second embodiment of the invention will be described. FIG. 6 is a flowchart illustrating an image display process according to at least one embodiment of the invention. First, the image display apparatus 1 transmits an image transmission request to the image providing server apparatus 3 (step S21). The image providing server apparatus 3 receives the image transmission request transmitted from the image display apparatus (step S22). The image providing server apparatus 3 determines whether the stored image size satisfies the predetermined condition (step S23). In the determination of the image size, when it is determined that the image size does not satisfy the predetermined condition (NO in step S23) the image size is controlled to satisfy the predetermined condition in the state where the similar figures to the image are retained (step S24). When it is determined that the image size does not satisfy the predetermined condition (NO in step S23), the image providing server apparatus 3 transmits the adjusted image of which the image size is adjusted to the image display apparatus, and transmits the stored image to the image display apparatus (step S25), when it is determined that the image size satisfies the predetermined condition (YES in step S23). The image display apparatus 1 receives the image transmitted in step S25 (step S26). Further, the image display apparatus 1 displays the received image in the display section (step S27), and then, terminates the process. The predetermined condition in determining the image size in step S23 indicates a condition that the image size is within a predetermined range with respect to the screen size of the display section.

As an aspect of the second embodiment, when the image size satisfies the predetermined condition, the image size is not adjusted, and thus, it is possible to prevent reduction of image visual quality due to adjustment. Further, since most working-out operations are performed by an image providing server, a user can comfortably view the image even using an image display apparatus which has a simple mechanism. Further, as the image size is adjusted to satisfy the predetermined condition in a state where the similar figures to the image are retained, it is possible to display the image without reducing image visual quality with respect to the image display apparatus having a different aspect ratio.

In the second embodiment, the "image" indicates a figure, a photo, a picture, a graphic, or the like, or may be either of a still image or a moving image. The "display section" indicates a monitor, a display, or the like for displaying an image, which may use liquid crystals, plasma, or the like, and may also use a touch panel display, for example. The "image reading" indicates that image data is read from a storage device provided in the image display apparatus, for example, or is read from a storage medium such as a DVD through a reading device. The "image size" indicates the size of an image in horizontal and vertical directions in a front view of the image using the unit of pixels, dots or critical areas. The "predetermined condition" indicates a condition for determining whether to control the size of the image, for example. The "similar figures" indicate figures having the same ratio of corresponding sides and having the same corresponding angles. The "predetermined range with respect to the screen size" indicates a range of a predetermined ratio with respect to the screen size, or a range of a predetermined distance from an edge of the image.

Third Embodiment

Figure 7:
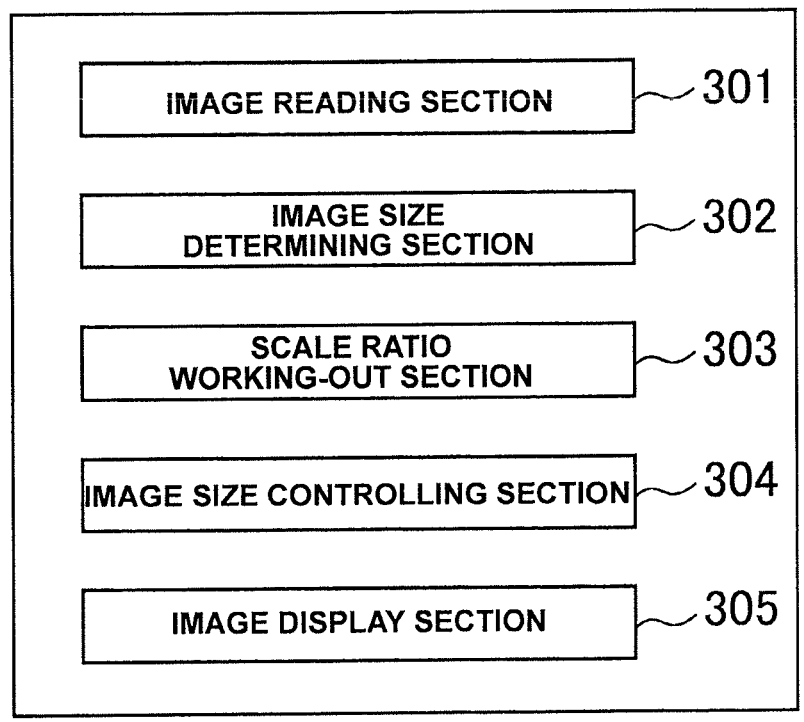
FIG. 7 is a block diagram illustrating a configuration of an image display apparatus according to at least one embodiment of the invention.

Next, the outline of a third embodiment of the invention will be described. FIG. 7 is a block diagram illustrating a configuration of an image display apparatus according to at least one embodiment of the invention. An image display apparatus 1 at least includes an image reading section 301, an image size determining section 302, a scale ratio working-out section 303, an image size controlling section 304, and an image display section 305.

The image reading section 301 has a function of reading an image into the image display apparatus 1. The image size determining section 302 has a function of determining whether an image size of the image read by the image reading section 301 satisfies a predetermined condition. The scale ratio working-out section 303 has a function of working out a scale ratio for controlling the image size so that the length of an adjusted image in the vertical direction or the horizontal direction of the screen satisfies a predetermined relationship with the length of a screen in any one corresponding direction among the vertical direction and the horizontal direction. The image size controlling section 304 has a function of controlling the image size, when it is determined by the image size determining section 302 that the image size does not satisfy the predetermined condition, so as to satisfy the predetermined condition in a state where similar figures to the image are retained. The image display section 305 has a function of displaying an adjusted image, when it is determined by the image size determining section 302 that the image size does not satisfy the predetermined condition, of which the image size is adjusted by the image size controlling section 304 in a display section, and displaying the image read by the image reading section 301 in the display section, when it is determined that the image size satisfies the predetermined condition.

Figure 8:
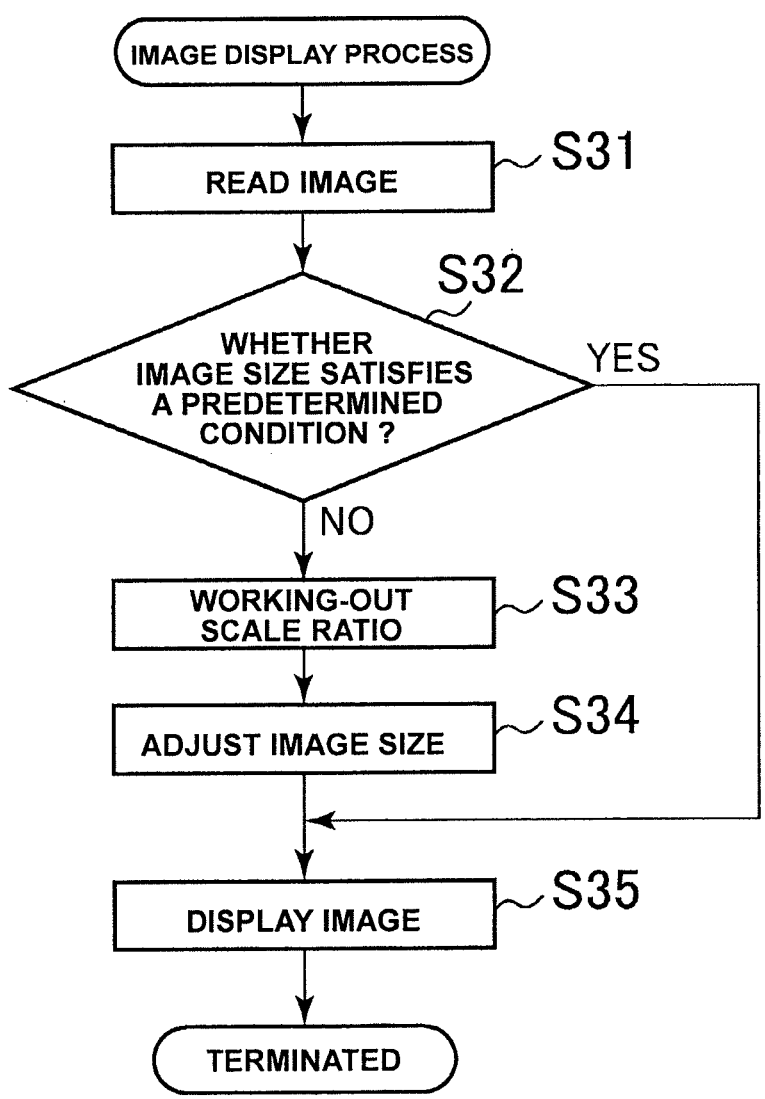
FIG. 8 is a flowchart illustrating an image display process according to at least one embodiment of the invention.

An image display process according to the third embodiment of the invention will be described. FIG. 8 is a flowchart illustrating an image display process according to at least one embodiment of the invention. First, in the image display apparatus 1, an image is read (step S31). Then, it is determined whether the image size of the read image satisfies a predetermined condition (step S32). When it is determined that the image size does not satisfy the predetermined condition (NO in step S32), a scale ratio for controlling the image size so that the length of an adjusted image in the vertical direction or horizontal direction of the screen satisfies a predetermined relationship with the length of a screen in any one corresponding direction among the vertical direction and the horizontal direction is worked out (step S33), and the image size is adjusted according to the worked-out scale ratio (step S34). Further, when it is determined that the image size does not satisfy the predetermined condition (NO in step S32), the adjusted image of which the image size is adjusted is displayed in the display section, and when it is determined that the image size satisfies the predetermined condition (YES in step S32), the image read in step S31 is displayed in the display section (step S35), and then, the process is terminated.

As an aspect of the third embodiment, it is possible to control the image in a state where similar figures to the image are retained as they are by simple working-out by using the scale ratio.

In the third embodiment, the "image" indicates a figure, a photo, a picture, a graphic, or the like, or may be any one of a still image and a moving image. The "vertical direction" indicates a direction vertical to the ground in a front view of a screen, for example, and the "horizontal direction" indicates a direction horizontal to the ground in the front view of the screen, for example. The "predetermined relationship" indicates a relationship in which the length of the adjusted image is equal to the length of a corresponding screen, or a relationship in which the length of the adjusted image has a predetermined ratio with respect to the length of the corresponding screen. The "adjustment of the image size according to the scale ratio" indicates that an operation of multiplying the scale ratio by the image size is performed, for example, to control the size.

Fourth Embodiment

Figure 9:
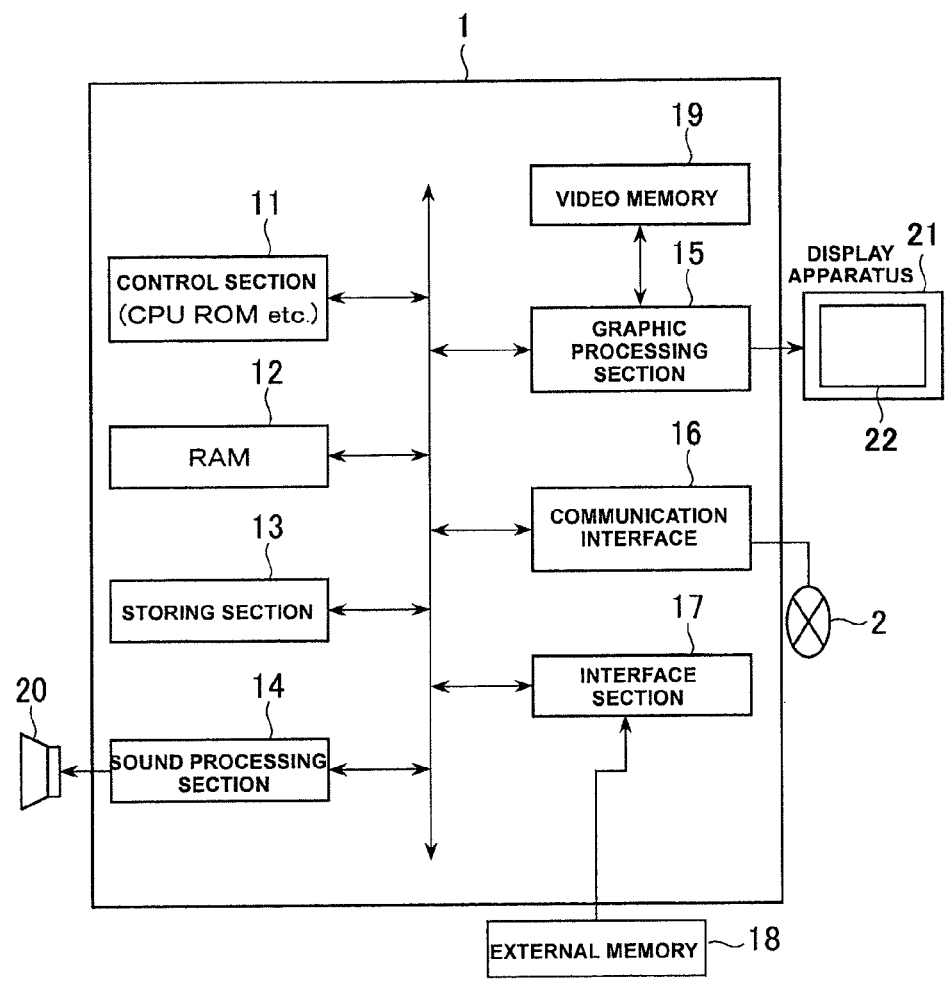
FIG. 9 is a block diagram illustrating a configuration of an image display apparatus according to at least one embodiment of the invention.

A fourth embodiment will be described. FIG. 9 is a block diagram illustrating a configuration of an image display apparatus according to at least one embodiment of the invention. An image display apparatus 1 includes a control section 11, a random access memory (RAM) 12, a storing section 13, a sound processing section 14, a graphic processing section 15, a communication interface 16, and an interface section 17, which are connected to each other by an internal bus, respectively.

The control section 11 includes a central processing unit (CPU), and a read only memory (ROM). The control section 11 executes a program stored in the storing section 13 to control the image display apparatus 1. The RAM 12 serves as a work area of the control section 11. The storing section 13 serves as a storage area for storing a program or data.

The control section 11 reads a program and data from the RAM 12 and performs processing. The control section 11 processes the program and the data loaded to the RAM 12, outputs a sound output command to the sound processing section 14, and outputs a drawing command to the graphic processing section 15.

The sound processing section 14 is connected to a sound output apparatus 20 such as a speaker. When the control section 11 outputs the sound output command to the sound processing section 14, the sound processing section 14 outputs a sound signal to the sound output apparatus 20.

The graphic processing section 15 is connected to a display apparatus 21. The display apparatus 21 has a display screen 22. When the control section 11 outputs the drawing command to the graphic processing section 15, the graphic processing section 15 develops an image in a video memory 19 and outputs a video signal for displaying an image on the display screen 22. Here, the display apparatus 21 may be a screen of a touch panel with a touch sensor.

The graphic processing section 15 executes drawing of one image in the unit of frames. One frame time of the image is, for example, $\frac{1}{30}$ seconds. The graphic processing section 15 manages a part of an operation process relating to the drawing performed by only the control section 11 to distribute workloads across the entire system.

An external memory 18 (for example, an SD card or the like) is connected to the interface section 17. Data read from the external memory 18 is loaded to the RAM 12, and the control section 11 executes an operation process for the read data.

The communication interface 16 may be connected to the communication line 2 in a wired or wireless manner, and may receive image data through the communication line 2. The data received through the communication interface 16 is loaded to the RAM 12, in a similar way to the data read from the external memory 18, and the control section 11 executes an operation process for the received data.

Figure 10:
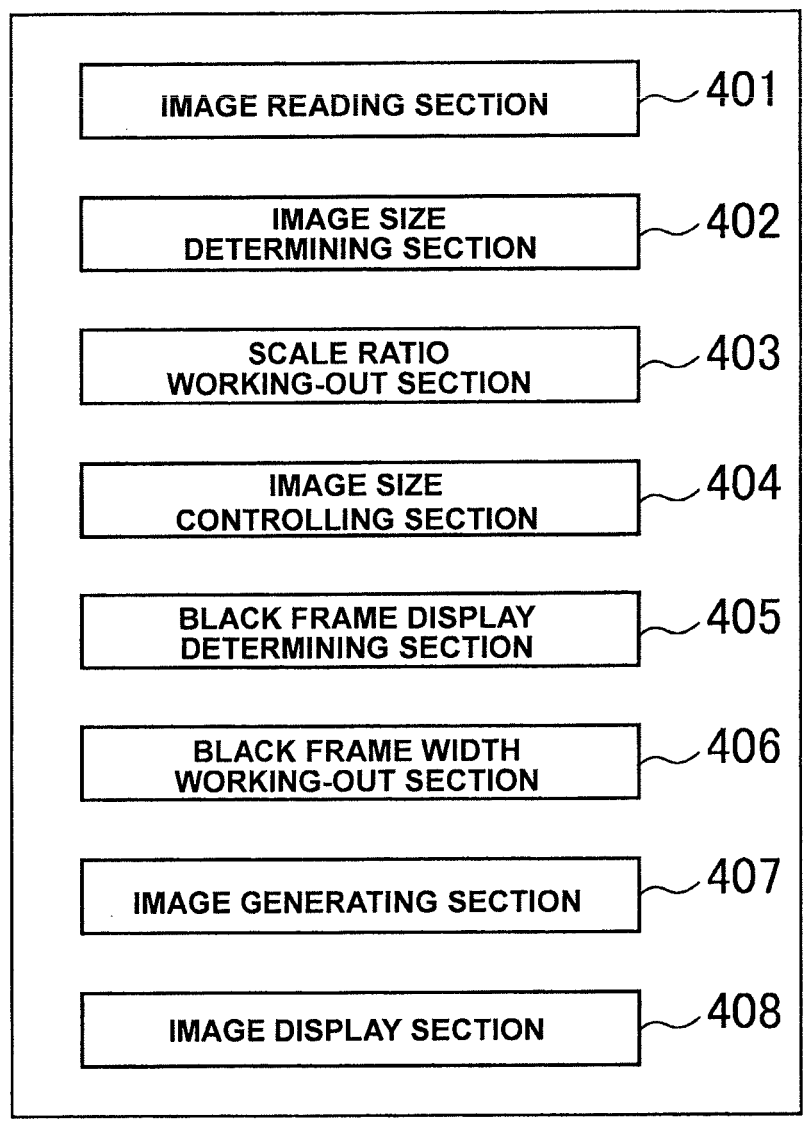
FIG. 10 is a block diagram illustrating a configuration of an image display apparatus according to at least one embodiment of the invention.

FIG. 10 is a block diagram illustrating a configuration of an image display apparatus according to at least one embodiment of the invention. An image display apparatus 1 at least includes an image reading section 401, an image size determining section 402, a scale ratio working-out section 403, an image size controlling section 404, a black frame display determining section 405, a black frame width working-out section 406, an image generating section 407, and an image display section 408.

The image reading section 401 has a function of reading an image into the image display apparatus 1. The image size determining section 402 has a function of determining whether an image size of the image read by the image reading section 401 satisfies a predetermined condition. The scale ratio working-out section 403 has a function of working out a scale ratio for controlling the image size so that the length of an adjusted image in the vertical direction or the horizontal direction of the screen satisfies a predetermined relationship with the length of a screen in any one corresponding direction among the vertical direction and the horizontal direction. The image size controlling section 404 has a function of controlling the image size, when it is determined by the image size determining section 402 that the image size does not satisfy the predetermined condition, so as to satisfy the predetermined condition in a state where similar figures to the image are retained.

The black frame display determining section 405 has a function of determining the presence or absence of the display of a black frame which is an external frame of the image with respect to the image read by the image reading section 401 when it is determined by the image size determining section 402 that the image size satisfies the predetermined condition. The black frame width working-out section 406 has a function of working out the width of the black frame from the width of a space generated between the image and the screen, when it is determined by the black frame display determining section 405 that the image size is smaller than the screen size. The image generating section 407 has a function of generating a new image by combining the black frame having the width worked-out by the black frame width working-out section 406 and the image. The image display section 408 has a function of displaying an adjusted image, when it is determined by the image size determining section 402 that the image size does not satisfy the predetermined condition, of which the image size is adjusted by the image size controlling section 404 in a display section of the image display apparatus 1, displaying the image read by the image reading section 401 in the display section when it is determined by the black frame display determining section 405 that the display of the black frame is not necessary, or displaying the image generated by the image generating section 407 in the display section when it is determined by the black frame display determining section 405 that the display of the black frame is necessary.

Figure 11:
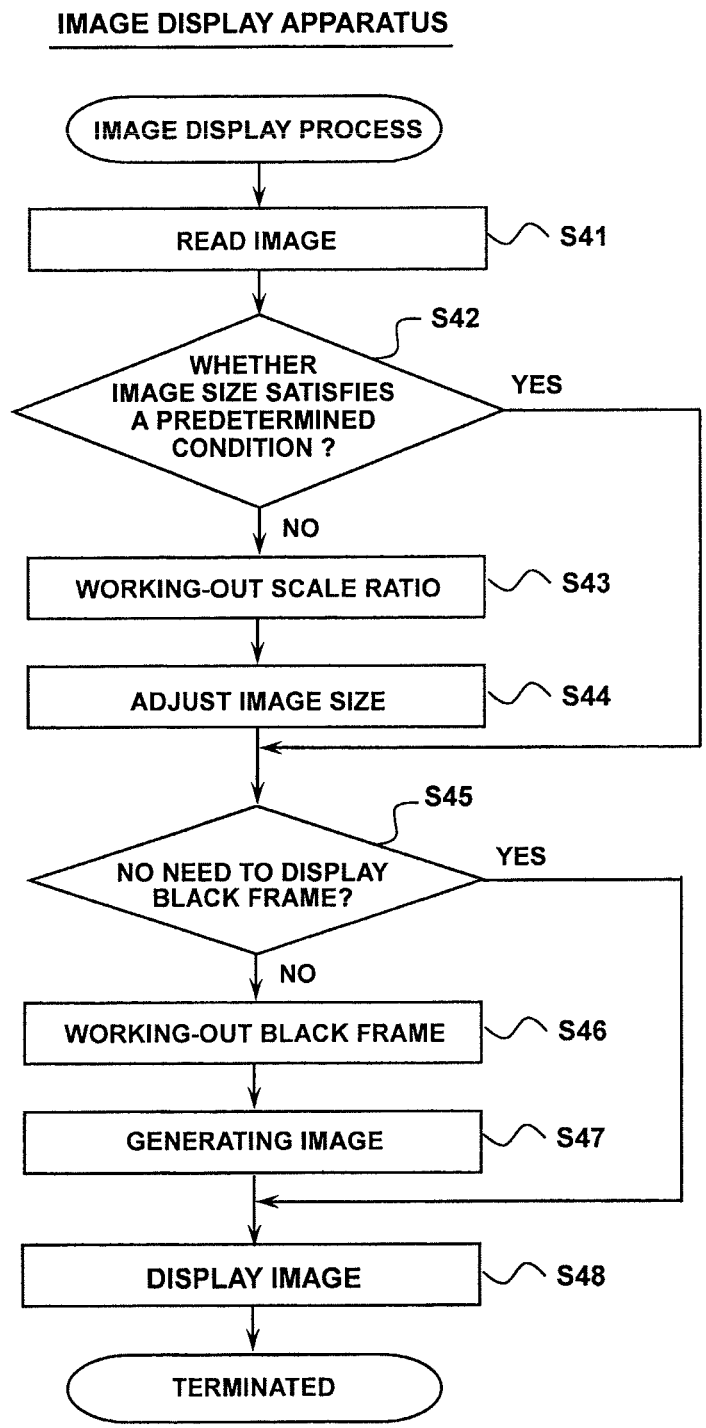
FIG. 11 is a flowchart illustrating an image display process according to at least one embodiment of the invention.

An image display process in the fourth embodiment of the invention will be described. FIG. 11 is a flowchart illustrating an image display process according to at least one embodiment of the invention. First, in the image display apparatus 1, an image is read (step S41). Then, it is determined whether an image size of the read image satisfies a predetermined condition (step S42).

Figure 12:
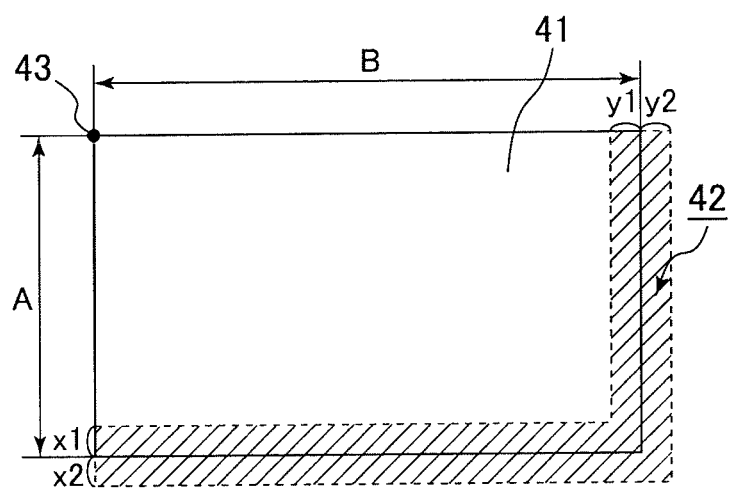
FIG. 12 is a conceptual diagram relating to a predetermined condition in image size determination according to at least one embodiment of the invention.

The predetermined condition in the determination of the image size in step S42 will be described. FIG. 12 is a conceptual diagram relating to a predetermined condition in image size determination according to at least one embodiment of the invention. A screen 41 has a length "A" in the vertical direction, and a length "B" in the horizontal direction. When a lower right apex of the image, which is a determination target, is present in the entire region of a region of the lower right side peak point of the image, which is also a determination target, in a region having a width $x_1$ in an upward direction of the screen and a width $x_2$ in a downward direction of the screen with reference to a point spaced from a base point 43 by vertical length "A" of the screen, and a region having a width $y_1$ in a leftward direction of the screen and a width $y_2$ in a rightward direction of the screen with reference to a point spaced from the base point 43 by horizontal length "B" of the screen, that is, in a range of an inclined portion 42, the predetermined condition is satisfied. Here, $x_1$, $x_2$, $y_1$, and $y_2$ are arbitrary values. Accordingly, the predetermined condition indicates a condition that vertical length "h" of the image which is the determination target is within a range of $A-x_1 \leq h \leq A+x_2$ and horizontal length "w" of the image is within a range of $B-y_1 \leq w \leq B+y_2$.

When it is determined that the image size does not satisfy the predetermined condition in the flowchart of FIG. 11 (NO in step S42), the scale ratio for controlling the image size so that the length of an adjusted image in the vertical direction or the horizontal direction of the screen satisfies a predetermined relationship with the length of a screen in any one corresponding direction among the vertical direction and the horizontal direction is worked out (step S43), and then, the image size is adjusted according to the worked-out scale ratio (step S44).

Figure 13A:
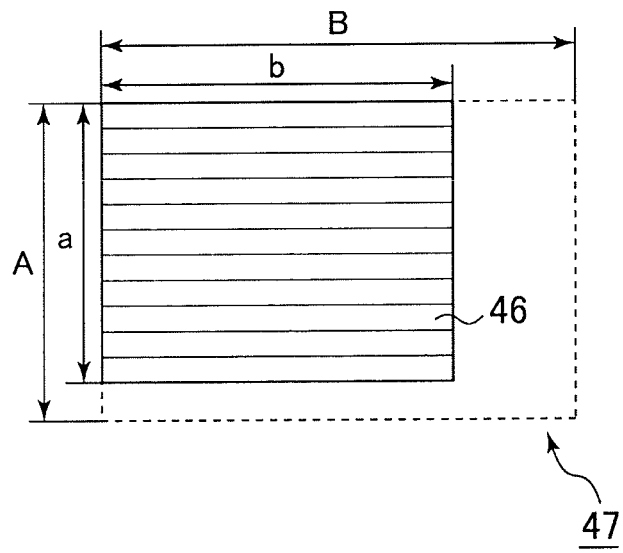
FIGS. 13A and 13B are conceptual diagrams relating to image adjustment according to at least one embodiment of the invention.
Figure 13B:
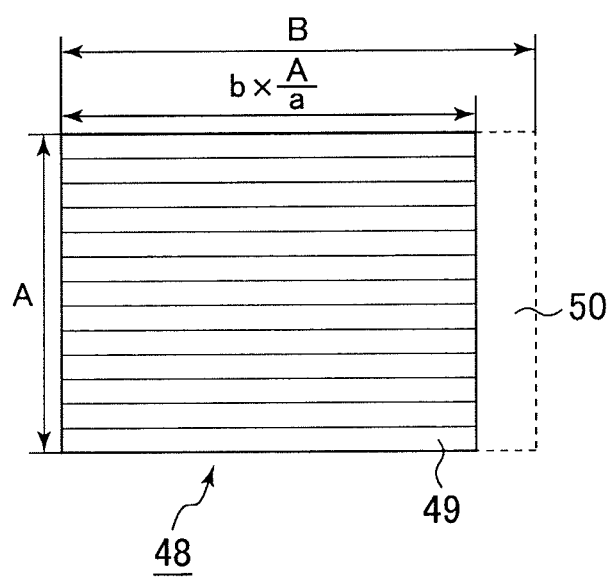

Next, the working-out of the scale ratio and the adjustment of the image size will be described with reference to the drawings. FIGS. 13A and 13B are conceptual diagrams relating to image adjustment according to at least one embodiment of the invention, in which FIG. 13A is a diagram illustrating a screen 47 of the display section provided in the image display apparatus 1 and an image 46 read by the image reading section 401. It is assumed that the ratio of the vertical length and the horizontal length of the image 46 and the aspect ratio of the screen 47 are different from each other. Here, for example, when the ratio of the length of the adjusted image in the vertical direction of the screen and the length of the screen in the vertical direction is represented as a first ratio and the ratio of the length of the adjusted image in the horizontal direction of the screen and the length of the screen in the horizontal direction is represented as a second ratio, the first ratio is compared with the second ratio. When the first ratio is larger than the second ratio, the second ratio is set as the scale ratio for controlling the image, and when the second ratio is larger than the first ratio, the first ratio is set as the scale ratio for controlling the image. In step S43, a ratio A/a of vertical length "a" of the image 46 and the corresponding vertical length "A" of the screen 47 is worked out. Similarly, a ratio B/b of horizontal length "b" of the image 46 and the corresponding horizontal length "B" of the screen 47 is worked out. The ratios are compared with each other, and a smaller ratio is set as the scale ratio for controlling the image. In step S44, the image size is adjusted using the scale ratio worked-out in step S43 so that the length of an adjusted image in the vertical direction or the horizontal direction satisfies a predetermined relationship with respect to the length of the screen in any one corresponding direction among the vertical direction and the horizontal direction of the screen.

FIG. 13B is a conceptual diagram illustrating a predetermined relationship relating to the adjustment based on the scale ratio, in which the ratio A/a is smaller than the ratio B/b in FIG. 13A. Here, the predetermined relationship is an adjustment relationship such that the vertical length of the screen and the vertical length of the image are the same, and is a relationship between the screen and the image when the ratio of the vertical length and horizontal length of the image and the aspect ratio of the screen are different from each other. When the vertical length "a" of the image 46 is multiplied by the scale ratio A/a, the vertical length of the image 46 becomes the vertical length "A" of the screen 47, and the horizontal length of the image 46 becomes b×A/a.

When the image size satisfies a predetermined condition in step S42 (YES in step S42), it is determined whether it is necessary to display a black frame with respect to the image read in step S41, and when the image size does not satisfy the predetermined condition in step S42 (NO in step S42), it is determined whether it is necessary to display the black frame with respect to the adjusted image in step S44 (step S45) in the flowchart of FIG. 11. Here, when the image size is larger than the size of the screen, it is determined that it is not necessary to display the black frame in the image (YES in step S45). On the other hand, when the image size is smaller than the size of the screen, it is determined that it is necessary to display the black frame in the image (NO in step S45).

When it is determined that it is necessary to display the black frame in step S45 (NO in step S45), the width of the black frame to be displayed is worked out (step S46). Further, a new image is generated by combining a frame having the worked-out black frame width and the image (step S47).

Figure 14A:
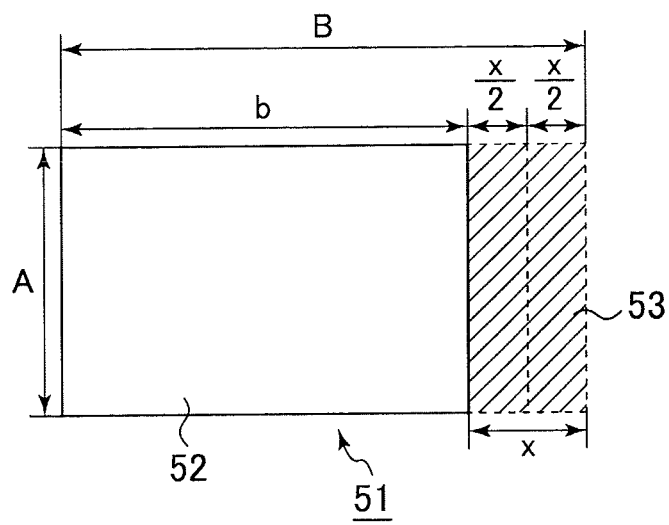
FIGS. 14A and 14B are conceptual diagrams relating to a black frame width working-out process according to at least one embodiment of the invention.
Figure 14B:
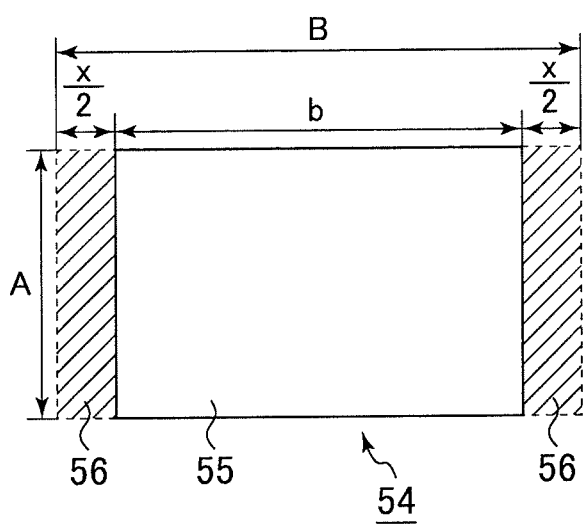

FIGS. 14A and 14B are conceptual diagrams relating to a black frame width working-out process according to at least one embodiment of the invention, in which FIG. 14A is a conceptual diagram when a horizontal length of an image is shorter than a horizontal length of a screen. A screen 51 includes an image 52, and a space 53 generated between the screen 51 and the image 52. In step S46, when horizontal length of the space 53 is x, the width of the black frame is worked out as x/2. FIG. 14B is a diagram illustrating a new image generating process using arrangement of black frames having the width worked-out in FIG. 14A. An image 55 is arranged at the center of a screen 54, and black frames 56 each having the width x/2 are arranged on opposite right and left sides of the image 55. In step S47, as shown in FIG. 14B, the image and the black frames are arranged to generate a new image for screen display. This is similarly applied to arrangement of black frames in the vertical direction of the screen.

Finally, when it is determined that the image size satisfies the predetermined condition in step S42 (YES in step S42) and when it is determined that it is not necessary to display the black frame in step S45 (YES in step S45), the image read in step S41 is displayed on the screen; when it is determined that the image size does not satisfy the predetermined condition in step S42 (NO in step S42) and when it is determined that it is not necessary to display the black frame in step S45 (YES in step S45), the image adjusted in step S44 is displayed on the screen; and when it is determined that it is necessary to display the black frame in step S45 (NO in step S45), the image generated in step S47 is displayed on the screen (step S48), and then, the process is terminated.

In the fourth embodiment, the predetermined condition in determining the image size is a condition that the length of the image in the vertical direction of the screen is within the predetermined range with respect to the length of the screen in the vertical direction and the length of the image in the horizontal direction of the screen is within the predetermined range with respect to the length of the screen in the horizontal direction. Further, the image and the display section have approximate rectangular shapes.

As an aspect of the fourth embodiment, when the image size is adjusted by using a smaller ratio value as the scale ratio, it is possible to display the entirety of the image, and to exclude an element that reduces image visual quality such as non-display parts of the image.

As another aspect of the fourth embodiment, as the frame is arranged, it is possible to control the image to have the ratio of the vertical length and the horizontal length suitable for the aspect ratio of the screen, and to prevent collapsing of the content of the image. As a result, it is possible for an image provider to efficiently provide an image regardless of variation in the aspect ratios of screens.

In the fourth embodiment, the "image" indicates a figure, a photo, a picture, a graphic, or the like, or may be either of a still image or a moving image. The "predetermined range with respect to the length of the screen" indicates a range where the length of the image and the corresponding length of the screen are the same, or a range where the length of the image is equal to or smaller than a length obtained by multiplying the length of the screen by a predetermined ratio, for example. The "predetermined relationship" indicates a relationship that the image size and the corresponding screen size are the same, or a relationship that the image size is larger than the screen size by a predetermined ratio, for example. The "frame" indicates a frame that is assigned in the vertical direction with respect to a horizontally long image in which an aspect ratio of a screen is 9:16, such as a high vision screen or a wide screen, and converts its aspect ratio into a ratio of a conventional TV screen having an aspect ratio of 4:3, in which a black frame is typically used, but the color is not particularly limited.

Fifth Embodiment

A configuration of an image display system according to a fifth embodiment may be the same as the configuration shown in the block diagram of FIG. 3.

Figure 15:
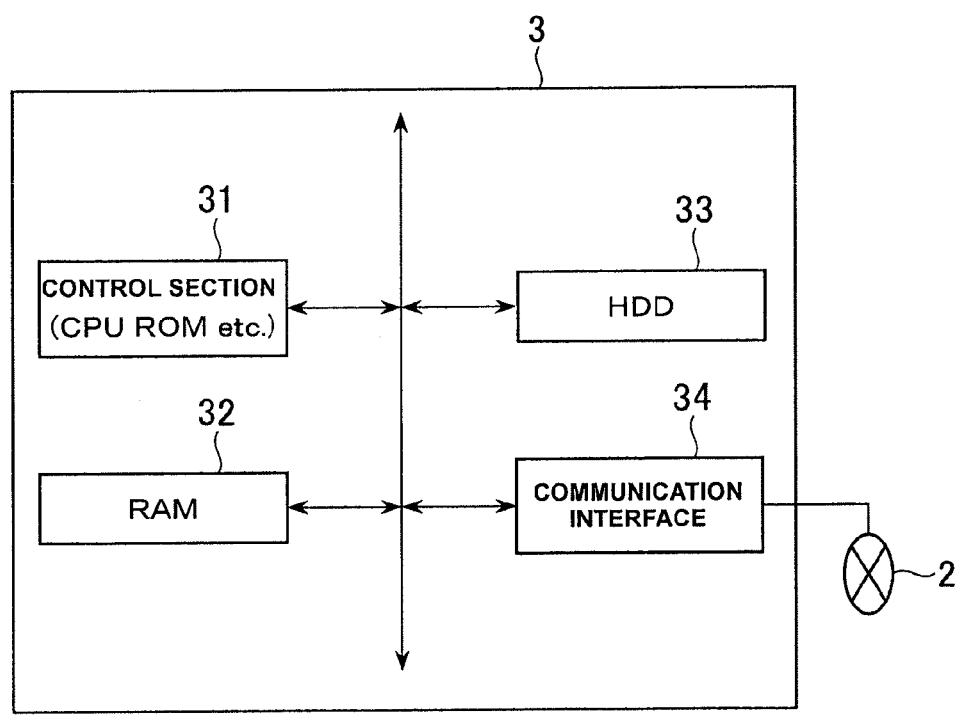
FIG. 15 is a block diagram illustrating a configuration of an image providing server apparatus according to at least one embodiment of the invention.

FIG. 15 is a block diagram illustrating a configuration of an image providing server apparatus according to at least one embodiment of the invention. An image providing server apparatus 3 includes a control section 31, a RAM 32, an HDD 33, and a communication interface 34, which are connected to each other by an internal bus, respectively.

The control section 31 includes a central processing unit (CPU), and a read only memory (ROM). The control section 31 executes a program stored in the HDD 33 to control the image providing server apparatus 3. The RAM 32 serves as a work area of the control section 31. The HDD 33 serves as a storage area for storing a program or data. The control section 31 reads a program and data from the RAM 32, and performs information processing, data processing, or the like.

Figure 16:
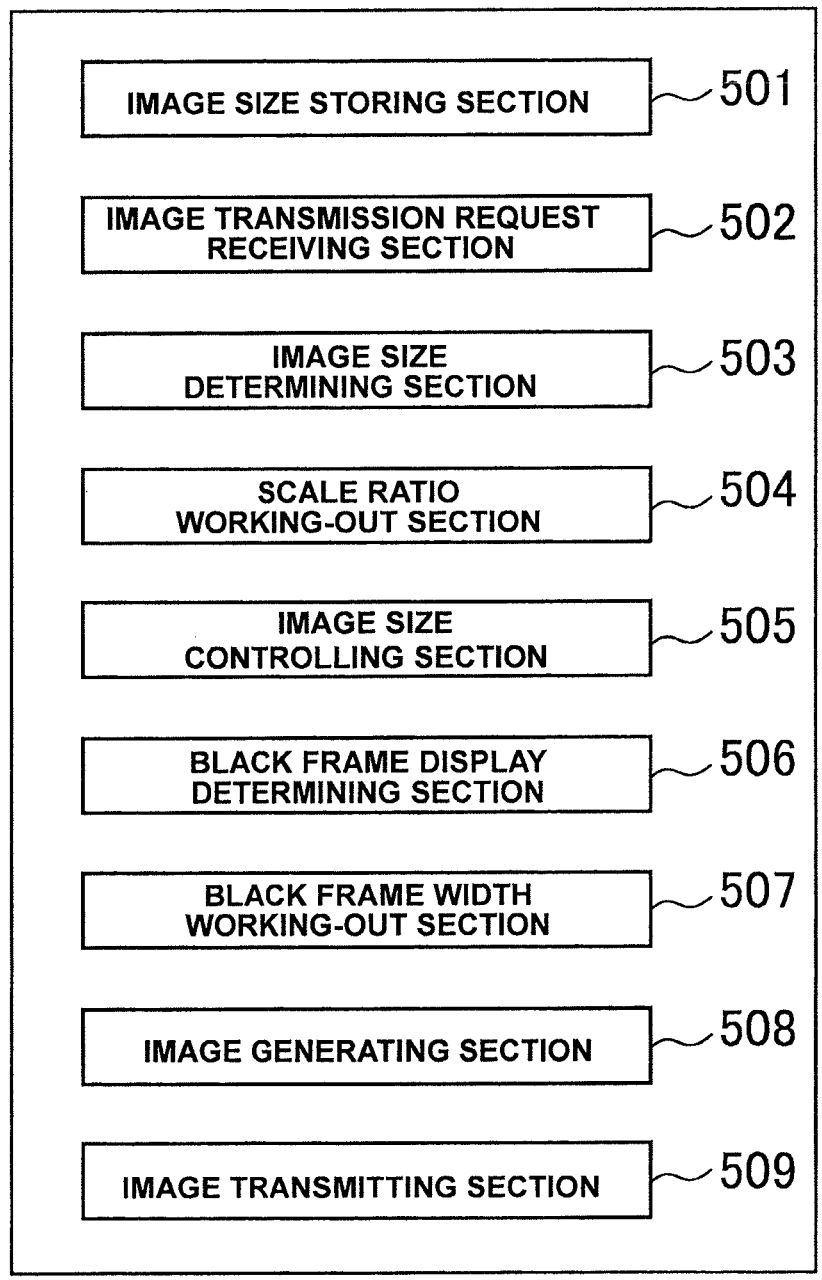
FIG. 16 is a block diagram illustrating a configuration of an image providing server apparatus according to at least one embodiment of the invention.

FIG. 16 is a block diagram illustrating a configuration of an image providing server apparatus according to at least one embodiment of the invention. An image providing server apparatus 3 at least includes an image size storing section 501, an image transmission request receiving section 502, an image size determining section 503, a scale ratio working-out section 504, an image size adjusting section 505, a black frame display determining section 506, a black frame width working-out section 507, an image generating section 508, and an image transmitting section 509.

The image size storing section 501 has a function of storing an image size of an image to be provided. The image transmission request receiving section 502 has a function of receiving an image transmission request transmitted from the image display apparatus. The image size determining section 503 has a function of determining whether or not an image size satisfies a predetermined condition. The scale ratio working-out section 504 has a function of working out a scale ratio for controlling the image size so that the length of an adjusted image in the vertical direction or the horizontal direction of the screen satisfies a predetermined relationship with the length of a screen in any one corresponding direction among the vertical direction and the horizontal direction. The image size controlling section 505 has a function of controlling the image size, when it is determined by the image size determining section 503 that the image size does not satisfy the predetermined condition, so as to satisfy the predetermined condition in a state where similar figures to the image are retained.

The black frame display determining section 506 has a function of determining the presence or absence of display of a black frame with respect to the image stored in the image size storing section 501 when it is determined by the image size determining section 503 that the image size satisfies the predetermined condition. The black frame width working-out section 507 has a function of working out the width of the black frame from the width of a space generated between the image and the screen, when it is determined by the black frame display determining section 506 that the image size is smaller than the screen size. The image generating section 508 has a function of generating a new image by combining the black frame having the width worked-out by the black frame width working-out section 507 and the image. The image transmitting section 509 has a function of transmitting an adjusted image of which the image size is adjusted by the image size controlling section 505 to the image display apparatus 1 when it is determined by the image size determining section 503 that the image size does not satisfy the predetermined condition, transmitting the image stored in the image size storing section 501 to the image display apparatus 1 when it is determined by the black frame display determining section 506 that it is not necessary to display the black frame, or transmitting an image generated by the image generating section 508 when it is determined by the black frame display determining section 506 that it is necessary to display the black frame.

Next, the outline of the fifth embodiment of the invention will be described. The fifth embodiment of the invention may be applied to an image display system that includes plural image display apparatuses 1, and an image providing server apparatus 3 capable of communicating with the image display apparatuses 1. An image display system according to the fifth embodiment of the invention is a system that causes the image display apparatus 1 having a display section to display an image by a regenerating method such as downloading from the image providing server apparatus 3 connected through the communication line 2 or streaming. The communication line may be provided in a wired form or a wireless form.

A configuration of the screen display apparatus according to the fifth embodiment may be the same as the configuration shown in the block diagrams of FIGS. 5 and 9.

Figure 17:
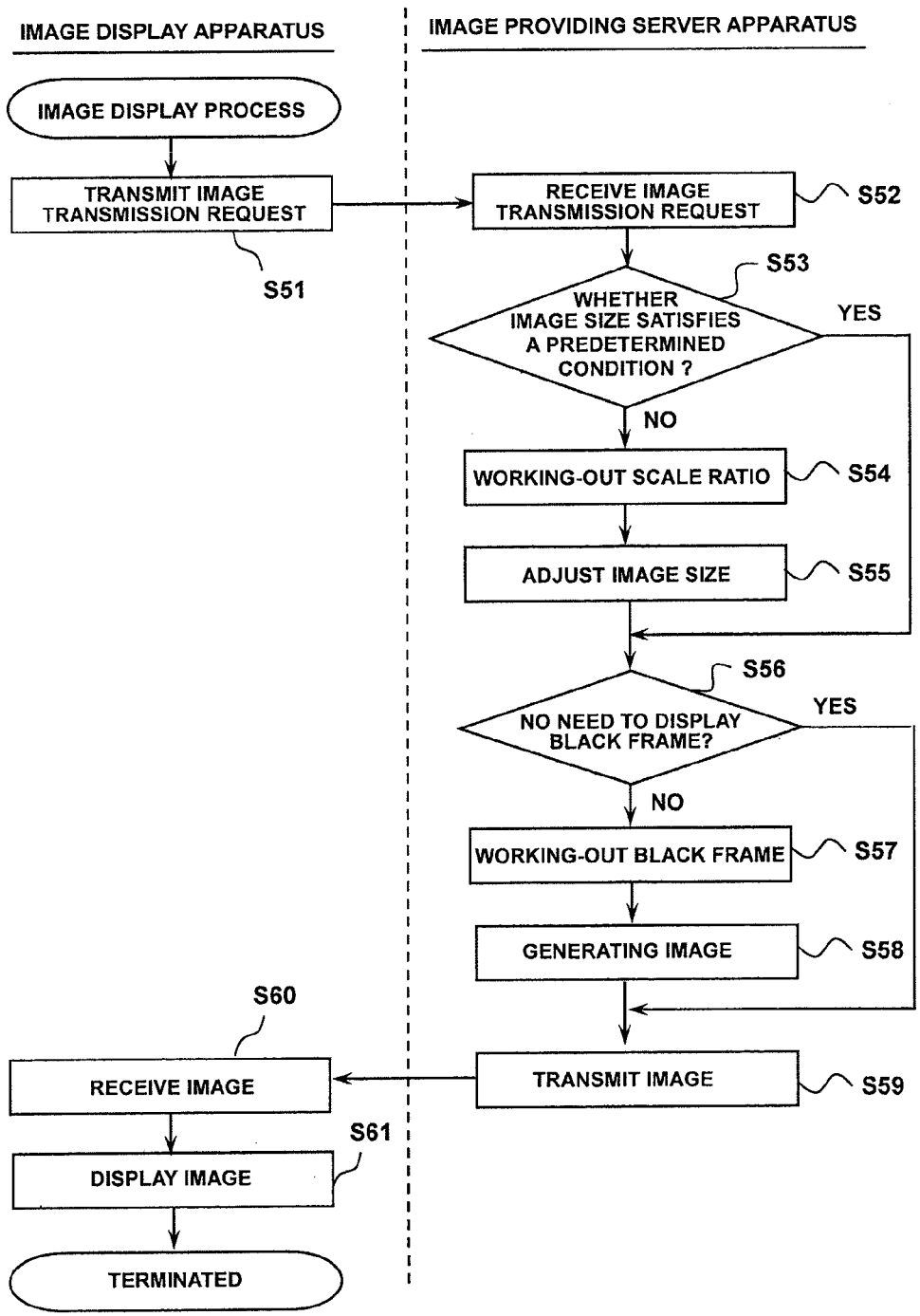
FIG. 17 is a flowchart illustrating an image display process according to at least one embodiment of the invention.

An image display process according to the fifth embodiment will be described. FIG. 17 is a flowchart illustrating an image display process according to at least one embodiment of the invention. First, the image display apparatus 1 transmits an image transmission request to the image providing server apparatus 3 (step S51). Here, the image transmission request includes information relating to a request signal for transmitting an image for display and the size of a screen of a display section included in the image display apparatus 1. The image providing server apparatus 3 receives the image transmission request transmitted from the image display apparatus (step S52). The image providing server apparatus 3 determines whether the image size of the stored image satisfies a predetermined condition using the screen size of the image display apparatus included in the received image transmission request (step S53). The predetermined condition in the determination of the image size is similar to the concept described with reference to FIG. 12. In the determination of the image size, when it is determined that the image size does not satisfy the predetermined condition (NO in step S53), a scale ratio for controlling the image size so that the length of an adjusted image in the vertical direction or the horizontal direction of the screen satisfies a predetermined relationship with the length of the screen in any one corresponding direction among the vertical direction and the horizontal direction is worked out (step S54), and the image size is adjusted according to the worked-out scale ratio (step S55). Further, the working-out of the scale ratio and the adjustment of the image size are similar to the concept described with reference to FIGS. 13A and 13B.

When it is determined that the image size satisfies the predetermined condition in step S53 (YES in step S53), it is determined whether it is necessary to display a black frame with respect to the image stored in the image providing server apparatus 3, and when it is determined that the image size does not satisfy the predetermined condition in step S53 (NO in step S53), it is determined whether it is necessary to display the black frame with respect to the adjusted image in step S55 (step S56). Here, when the image size is larger than the size of the screen, it is determined that it is not necessary to display the black frame in the image (YES in step S56). On the other hand, when the image size is smaller than the size of the screen, it is determined that it is necessary to display the black frame in the image (NO in step S56). The working-out of the width of the black frame is similar to the concept described with reference to FIGS. 14A and 14B.

Next, in the flowchart of FIG. 17, when it is determined that it is necessary to display the black frame in step S56 (NO in step S56), the width of the black frame to be displayed is worked out (step S57). Further, a new image is generated by combining the black frame having the worked-out width and the image (step S58).

Further, when it is determined that the image size satisfies the predetermined condition in step S53 (YES in step S53) and when it is determined that it is not necessary to display the black frame in step S56 (YES in step S56), the image stored in the image providing server apparatus 3 is transmitted to the screen display apparatus 1; when it is determined that the image size does not satisfy the predetermined condition in step S53 (NO in step S53) and when it is determined that it is not necessary to display the black frame in step S56 (YES in step S56), the image adjusted in step S55 is transmitted to the screen display apparatus 1; and when it is determined that it is necessary to display the black frame in step S56 (NO in step S56), the image generated in step S58 is transmitted to the screen display apparatus 1 (step S59). The image display apparatus 1 receives the transmitted image (step S60). Further, the received image is displayed in the display section (step S61), and the procedure is terminated.

In the fifth embodiment, the predetermined condition in determining the image size is a condition that the length of the image in the vertical direction of the screen is within the predetermined range with respect to the length of the screen in the vertical direction and the length of the image in the horizontal direction of the screen is within the predetermined range with respect to the length of the screen in the horizontal direction. Further, the image and the display section have approximate rectangular shapes.

As an aspect of the fifth embodiment, when the image size is adjusted by using a smaller ratio value as the scale ratio, it is possible to display the entirety of the image, and to exclude an element that reduces image visual quality such as the non-display parts of the image.

As another aspect of the fifth embodiment, as the frame is arranged, it is possible to control the image to have the ratio of the vertical length and the horizontal length suitable for the aspect ratio of the screen, and to prevent collapsing of the content of the image. As a result, it is possible for an image provider to efficiently provide an image without considering variation of the aspect ratio of the screen.

As still another aspect of the fifth embodiment, since most of the operation processes are executed by the image providing server, it is possible for a user to smoothly watch an image by an image display apparatus having a simple mechanism.

In the fifth embodiment, the "image" indicates a figure, a photo, a picture, a graphic, or the like, or may be either of a still image or a moving image. The "predetermined range with respect to the length of the screen" indicates a range where the length of the image and the corresponding length of the screen are the same, or a range where the length of the image is equal to or smaller than a length obtained by multiplying the length of the screen by a predetermined ratio, for example. The "predetermined relationship" indicates a relationship that the image size and the corresponding screen size are the same, or a relationship that the image size is larger than the screen size by a predetermined ratio, for example. The "frame" indicates a frame that is assigned in the vertical direction with respect to a horizontally long image in which an aspect ratio of a screen is 9:16, such as a high vision screen or a wide screen, and converts its aspect ratio into a ratio of a conventional TV screen having an aspect ratio of 4:3, in which a black frame is typically used, but the color is not particularly limited.

APPENDIX

The above description is made so as to enable any person ordinarily skilled in the art to which the invention pertains to work the following configurations of the invention.

An image display program executed in an image display apparatus that includes a display section that displays an image is provided. The program causes the image display apparatus to function as: an image reader that reads an image; an image size determiner that determines whether an image size of the image read by the image reader satisfies a predetermined condition; an image size adjuster that adjusts the image size, when it is determined by the image size determiner that the image size does not satisfy the predetermined condition, so as to satisfy the predetermined condition in a state where similar figures to the image are retained; and an image displayer that displays an adjusted image, when it is determined by the image size determiner that the image size does not satisfy the predetermined condition, of which the image size is adjusted by the image size adjuster in the display section, and displays the image read by the image reader in the display section, when it is determined that the image size satisfies the predetermined condition. The predetermined condition is a condition that the image size is within a predetermined range with respect to a screen size of the display section.

In an embodiment of the image display program described in the preceding paragraph, the program further causes the image display apparatus to further function as a scale ratio working-outer that works out a scale ratio for controlling the image size so that a length of an adjusted image in a vertical direction or a horizontal direction of a screen satisfies a predetermined relationship with a length of the screen in any one corresponding direction among the vertical direction and the horizontal direction. The image size adjuster adjusts the image size according to the worked-out scale ratio.

In an embodiment of the image display program described in the preceding paragraph, the scale ratio working-outer compares, when a ratio of the length of the adjusted image in the vertical direction of the screen and the length of the screen in the vertical direction is a first ratio and a ratio of the length of the adjusted image in the horizontal direction of the screen and the length of the screen in the horizontal direction is a second ratio, the first ratio with the second ratio, sets the second ratio as the scale ratio when the first ratio is larger than the second ratio, and sets the first ratio as the scale ratio when the second ratio is larger than the first ratio.

In further embodiments of the image display programs described in the preceding three paragraphs, the predetermined condition is a condition that the length of the image in the vertical direction of the screen is within a predetermined range with respect to the length of the screen in the vertical direction and the length of the image in the horizontal direction of the screen is within a predetermined range with respect to the length of the screen in the horizontal direction.

In further embodiments of the image display programs described in the preceding four paragraphs, when it is determined by the image size determiner that the image size does not satisfy the predetermined condition, and when the image size adjusted by the image size adjuster is smaller than the screen size, a frame is arranged in a space generated between the adjusted image and the display section.

In further embodiments of the image display programs described in the preceding five paragraphs, when it is determined by the image size determiner that the image size satisfies the predetermined condition, and when the size of the image read by the image reader is smaller than the screen size, a frame is arranged in a space generated between the image and the display section.

In further embodiments of the image display programs described in the preceding five paragraphs, the image and the display section have approximate rectangular shapes.

An image display apparatus in which the image display program according to any one of the preceding seven paragraphs is installed is also provided.

An image display method executed in an image display apparatus that includes a display section that displays an image is also provided. The method comprises the following functional steps executed in the image display apparatus: reading an image; determining whether or not an image size of the read image satisfies a predetermined condition; adjusting the image size, when it is determined in the determining step that the image size does not satisfy the predetermined condition, so as to satisfy the predetermined condition in a state where similar figures to the image are retained; and displaying an adjusted image, when it is determined in the determining step that the image size does not satisfy the predetermined condition, of which the image size is adjusted in the adjusting step in the display section, and displaying, when it is determined that the image size satisfies the predetermined condition, the read image in the display section. The predetermined condition is a condition that the image size is within a predetermined range with respect to a screen size of the display section.

An image display program executed in an image providing server apparatus capable of communicating with an image display apparatus that includes a display section that displays an image is also provided. The program causes the image providing server apparatus to function as: an image size storage that stores an image size of an image to be provided; an image size determiner that determines whether the image size of the stored image satisfies a predetermined condition; an image size adjuster that adjusts the image size, when it is determined by the image size determiner that the image size does not satisfy the predetermined condition, so as to satisfy the predetermined condition in a state where similar figures to the image are retained; and an image transmitter that transmits an adjusted image, when it is determined by the image size determiner that the image size does not satisfy the predetermined condition, of which the image size is adjusted by the image size adjuster to the image display apparatus, and transmits the image stored in the image size storage to the image display apparatus, when it is determined that the image size satisfies the predetermined condition. The predetermined condition is a condition that the image size is within a predetermined range with respect to a screen size of the display section.

An image providing server apparatus in which the image display program according to the preceding paragraph is installed is also provided.

An image display system including an image display apparatus that includes a display section that displays an image, and an image providing server apparatus capable of communicating with the image display apparatus is further provided. The image display apparatus includes: an image transmission request transmitter that transmits an image transmission request to the image providing server apparatus. The image providing server apparatus includes: an image size storage that stores an image size of an image to be provided; an image transmission request receiver that receives the image transmission request transmitted by the image transmission request transmitter; an image size determiner that determines whether the image size of the stored image satisfies a predetermined condition; an image size adjuster that adjusts the image size, when it is determined by the image size determiner that the image size does not satisfy the predetermined condition, so as to satisfy the predetermined condition in a state where similar figures to the image are retained; and an image transmitter that transmits an adjusted image, when it is determined by the image size determiner that the image size does not satisfy the predetermined condition, of which the image size is adjusted by the image size adjuster to the image display apparatus, and transmits the image stored in the image size storage to the image display apparatus, when it is determined that the image size satisfies the predetermined condition. The image display apparatus further includes: an image receiver that receives the image transmitted by the image transmitter; and an image displayer that displays the received image in the display section. The predetermined condition is a condition that the image size is within a predetermined range with respect to a screen size of the display section.

An image display program executed in an image display apparatus that is capable of communicating with an image providing server apparatus that provides an image, and includes a display section that displays the image is also provided. The program causes the image display apparatus to function as: an image transmission request transmitter that transmits an image transmission request to the image providing server apparatus; an image receiver that receives an image transmitted by an image transmitter; and an image displayer that displays the received image in the display section. The image providing server apparatus functions as: an image size storage that stores an image size of an image to be provided; an image transmission request receiver that receives the image transmission request transmitted by the image transmission request transmitter; an image size determiner that determines whether the image size of the stored image satisfies a predetermined condition; an image size adjuster that adjusts the image size, when it is determined by the image size determiner that the image size does not satisfy the predetermined condition, so as to satisfy the predetermined condition in a state where similar figures to the image are retained; and an image transmitter that transmits an adjusted image, when it is determined by the image size determiner that the image size does not satisfy the predetermined condition, of which the image size is adjusted by the image size adjuster to the image display apparatus, and transmits the image stored in the image size storage to the image display apparatus, when it is determined that the image size satisfies the predetermined condition. The predetermined condition is a condition that the image size is within a predetermined range with respect to a screen size of the display section.

An image display apparatus in which the image display program according to the preceding paragraph is installed is also provided.

An image display method executed in an image providing server apparatus capable of communicating with an image display apparatus that includes a display section that displays an image is further provided. The method comprises the following functional steps executed in the image providing server apparatus: determining whether or not an image size of an image satisfies a predetermined condition; adjusting the image size, when it is determined in the determining step that the image size does not satisfy the predetermined condition, so as to satisfy the predetermined condition in a state where similar figures to the image are retained; and transmitting an adjusted image, when it is determined in the determining step that the image size does not satisfy the predetermined condition, of which the image size is adjusted in the adjusting step to the image display apparatus, and transmitting an image before adjustment to the image display apparatus, when it is determined that the image size satisfies the predetermined condition. The predetermined condition is a condition that the image size is within a predetermined range with respect to a screen size of the display section.

An image display method executed in an image display system including an image display apparatus that includes a display section that displays an image, and an image providing server apparatus capable of communicating with the image display apparatus is provided. The method comprises: transmitting an image transmission request to the image providing server apparatus, by the image display apparatus; receiving the transmitted image transmission request, by the image providing server apparatus; determining whether the image size of the image satisfies a predetermined condition, by the image providing server apparatus; adjusting the image size, when it is determined in the determining that the image size does not satisfy the predetermined condition, so as to satisfy the predetermined condition in a state where similar figures to the image are retained, by the image providing server apparatus; transmitting an adjusted image, when it is determined in the determining that the image size does not satisfy the predetermined condition, of which the image size is adjusted in the adjusting to the image display apparatus, and transmitting an image before adjustment to the image display apparatus by the image providing server apparatus, when it is determined that the image size satisfies the predetermined condition; receiving the image transmitted from the image providing server apparatus, by the image display apparatus; and displaying the received image in the display section, by the image display apparatus. The predetermined condition is a condition that the image size is within a predetermined range with respect to a screen size of the display section.

The invention claimed is:

1. A non-transitory computer-readable recording medium including an image display program which is executed in an image display apparatus that includes a display that displays an image, the image display program causing the image display apparatus to:
   read an image;
   determine, by a processor, whether an image size of the image satisfies a predetermined condition;
   adjust the image size, when it is determined by the processor that the image size does not satisfy the predetermined condition, so as to satisfy the predetermined condition in a state where similar figures to the image are retained;
   display, by the display, an adjusted image, when it is determined by the processor that the image size does not satisfy the predetermined condition, of which the image size is adjusted; and
   display, by the display, the image, when it is determined by the processor that the image size satisfies the predetermined condition,
   wherein the predetermined condition includes a condition of the image size being within a predetermined range with respect to a screen size of the display, wherein the predetermined range is defined based on a predetermined distance from an edge of the image, and wherein the image size being larger than the screen size of the display than the predetermined distance.

2. The non-transitory computer-readable recording medium according to claim 1, the program further causing the image display apparatus to:
   determine, by the processor, a scale ratio for controlling the image size so that a length of the adjusted image in a vertical direction or a horizontal direction of a screen of the display satisfies a predetermined relationship with respect to a length of the screen in any one corresponding direction among the vertical direction and the horizontal direction,
   wherein the image size is adjusted according to the scale ratio.

3. The non-transitory computer-readable recording medium according to claim 2,
   wherein the processor compares, when a ratio of the length of the adjusted image in the vertical direction of the screen and the length of the screen in the vertical direction is a first ratio and a ratio of the length of the adjusted image in the horizontal direction of the screen and the length of the screen in the horizontal direction is a second ratio, the first ratio with the second ratio, sets the second ratio as the scale ratio when the first ratio is larger than the second ratio, and sets the first ratio as the scale ratio when the second ratio is larger than the first ratio.

4. The non-transitory computer-readable recording medium according to claim 1,
   wherein the condition includes the length of the image in the vertical direction of the screen being within a vertical predetermined range with respect to the length of the screen in the vertical direction and the length of the image in the horizontal direction of the screen being within a horizontal predetermined range with respect to the length of the screen in the horizontal direction.

5. The non-transitory computer-readable recording medium according to claim 1,
   wherein, when the processor determines that the image size does not satisfy the predetermined condition, and when an adjusted image size of the adjusted image is smaller than the screen size, a frame is arranged in a space generated between the adjusted image and a screen of the display.

6. The non-transitory computer-readable recording medium according to claim 1,
   wherein, when the processor determines that the image size satisfies the predetermined condition, and when the image size of the image is smaller than the screen size, a frame is arranged in a space generated between the image and a screen of the display.

7. The non-transitory computer-readable recording medium according to claim 1,
   wherein the image and a screen of the display have approximate rectangular shapes.

8. An image display apparatus in which the image display program included in the non-transitory computer-readable recording medium according to claim 1 is installed.

9. An image display method executed in an image display apparatus that includes a display that displays an image, the image display method comprising:
   reading, by the image display apparatus, an image;
   determining, by a processor of the image display apparatus, whether an image size of the image satisfies a predetermined condition;
   adjusting the image size, when it is determined by the processor that the image size does not satisfy the predetermined condition, so as to satisfy the predetermined condition in a state where similar figures to the image are retained;
   displaying, by the display, an adjusted image, when it is determined by the processor that the image size does not satisfy the predetermined condition, of which the image size is adjusted; and
   displaying, by the display, the image, when it is determined by the processor that the image size satisfies the predetermined condition,
   wherein the predetermined condition includes a condition of the image size being within a predetermined range with respect to a screen size of the display, wherein the predetermined range is defined based on a predetermined distance from an edge of the image, and wherein the image size being larger than the screen size of the display than the predetermined distance.

10. The non-transitory computer-readable recording medium according to claim 1, wherein the image size of the image is adjusted when the processor determines that the image size is outside the predetermined range and smaller than screen size of the display.

11. The non-transitory computer-readable recording medium according to claim 1, wherein the predetermined range is defined based on a predetermined ratio with respect to the screen size.

12. The non-transitory computer-readable recording medium according to claim 1, wherein the predetermined range is defined based on a predetermined distance from an edge of the image.

13. The image display method according to claim 9, wherein the image size of the image is adjusted when the processor determines that the image size is outside the predetermined range and smaller than screen size of the display.

14. The image display method according to claim 9, wherein the predetermined range is defined based on a predetermined ratio with respect to the screen size.

15. The image display method according to claim 9, wherein the predetermined range is defined based on a predetermined distance from an edge of the image.

* * * * *